(12) United States Patent
Musat et al.

(10) Patent No.: US 7,798,939 B2
(45) Date of Patent: Sep. 21, 2010

(54) LATCHING MEMBER FOR PARKING BRAKE AND CRUISE CONTROL

(75) Inventors: Carl Musat, Avon Lake, OH (US); Brian Carver, Medina, OH (US); Tim Dilgard, Ashland, OH (US); Adam Woodrum, Oberlin, OH (US)

(73) Assignee: MTD Products Inc, Valley City, OH (US)

( * ) Notice: Subject to any disclaimer, the term of this patent is extended or adjusted under 35 U.S.C. 154(b) by 1023 days.

(21) Appl. No.: 11/542,450

(22) Filed: Oct. 3, 2006

(65) Prior Publication Data

US 2007/0078582 A1 Apr. 5, 2007

Related U.S. Application Data

(60) Provisional application No. 60/723,022, filed on Oct. 3, 2005.

(51) Int. Cl.
*B60W 30/14* (2006.01)

(52) U.S. Cl. .................. 477/93; 180/170; 192/219.4; 477/92

(58) Field of Classification Search .................. 701/70; 56/11.3; 180/6.32, 6.34, 170; 192/219.4, 192/219.5; 477/192, 193
See application file for complete search history.

(56) References Cited

U.S. PATENT DOCUMENTS 2,777,335 A * 1/1957 Engberg et al. ............... 74/481
2,844,235 A * 7/1958 O'Connor .................... 477/193
3,313,174 A * 4/1967 Walker et al. ............. 74/473.17
3,710,904 A * 1/1973 Boyer et al. ............. 192/219.7
4,958,535 A * 9/1990 Swartzendruber ............ 74/481
5,022,477 A * 6/1991 Wanie ....................... 180/6.34
5,136,899 A * 8/1992 Hoch et al. .................... 477/96
5,152,382 A  10/1992 Hoch et al.
5,335,743 A * 8/1994 Gillbrand et al. ............ 180/178
6,279,937 B1  8/2001 Hunt
6,886,677 B2  5/2005 Rupiper et al.
2004/0074692 A1* 4/2004 Rupiper et al. .............. 180/336

* cited by examiner

*Primary Examiner*—Khoi Tran
*Assistant Examiner*—Stephen Holwerda
(74) *Attorney, Agent, or Firm*—Wegman, Hessler & Vanderburg

(57) ABSTRACT

A drive assembly for a working vehicle has an improved cruise control and parking brake engagement lever. The drive assembly includes a speed and direction control linkage operatively connecting the speed input mechanism with the transmission drive unit and a braking linkage operatively connected to the brake input mechanism for selectively slowing or stopping the movement of the drive wheel. A cruise control/parking brake engagement linkage interacts with the speed and direction control linkage and the braking linkage when the speed and direction control linkage and the braking linkage are in select conditions. The cruise control/parking brake engagement linkage has a single cruise control/parking brake operating lever that, upon actuation, locks the braking linkage in the brake engaged position to engage the parking brake feature and locks the speed and direction control linkage in a position corresponding to a desired speed to engage the cruise control feature.

20 Claims, 7 Drawing Sheets

LATCHING MEMBER FOR PARKING BRAKE AND CRUISE CONTROL

CROSS REFERENCE TO RELATED APPLICATION

This application claims the priority benefit of U.S. Provisional Patent Application Ser. No. 60/723,022 filed Oct. 3, 2005.

BACKGROUND OF THE INVENTION

1. Field of Invention

The invention relates to working vehicles such as lawn and garden tractors, and more specifically, to a drive control system for working vehicles with an improved parking brake and cruise control assembly.

2. Description of Related Art

Working vehicles, such as lawn and garden tractors, often utilize drive systems for controlling ground speed and direction that incorporate a cruise control feature and a parking brake feature. Typically, variable speed transmissions, such as hydrostatic transmissions or continuously variable transmissions, are utilized in these working vehicles. Forward and reverse foot pedals are used with such transmissions to select the direction of travel and to control the relative vehicle speed. The foot pedal system is coupled with a hand-operated cruise control lever which is generally used to maintain a specified forward speed, eliminating the need for constant application of foot pressure to keep the vehicle moving forward at the desired rate of speed.

A foot pedal brake is also typically used in such working vehicles. The foot pedal brake actuates a disc brake assembly within the vehicle transmission casing. The parking brake feature is typically operatively associated with the pedal brake and includes a hand-operated lever that locks the pedal brake in its fully engaged position.

Conventional systems, such as the one shown in U.S. Pat. No. 6,886,677 entitled Interlock of Parking Brake and Drive Control Pedals for Utility Vehicles, utilize separate hand-operated levers and linkages for the cruise control feature and the parking brake feature. The various connections involved in such systems require a number of mechanical linkages, and their interfaces with each other are often complex and difficult to service and modify. Accordingly, there is a need for a drive system for controlling the ground speed and direction of travel of a utility vehicle having a drive assembly with improved cruise control and parking brake features.

SUMMARY OF THE INVENTION

Exemplary embodiments of the present invention provide a novel drive assembly for a working vehicle. The working vehicle has an engine that powers at least one drive wheel through a transmission drive unit, the transmission drive unit being controlled with a speed input mechanism. The drive assembly has a cruise control feature used to maintain a specified vehicle speed thereby eliminating the need for constant application of pressure to the speed input mechanism in order to keep the vehicle moving at the desired rate of speed. The drive assembly also has a parking brake feature that locks a brake input mechanism in its brake engaged position. The drive assembly includes a speed and direction control linkage operatively connecting the speed input mechanism with the transmission drive unit and a braking linkage operatively connected to the brake input mechanism for selectively slowing or stopping the movement of the drive wheel. The drive assembly also includes a cruise control/parking brake engagement linkage interacting with the speed and direction control linkage and the braking linkage when the speed and direction control linkage and the braking linkage are in select conditions. The cruise control/parking brake engagement linkage has a single cruise control/parking brake operating lever that, upon actuation, locks the braking linkage in the brake engaged position to engage the parking brake feature and locks the speed and direction control linkage in a position corresponding to a desired speed to engage the cruise control feature such that the cruise control/parking brake lever is the only input mechanism required to engage the parking brake and cruise control features.

In one embodiment, the cruise control/parking brake engagement linkage has a pawl having a first engagement portion with a tooth formed thereon and a second engagement portion. The cruise control/parking brake operating lever causes the pawl to pivot such that the first engagement portion with the tooth is engagable with the speed and direction control linkage when the speed and direction control linkage is in a position corresponding to a desired speed to lock the linkage in the position to engage the cruise control feature. The cruise control/parking brake operating lever also causes the pawl to pivot such that second engagement portion is engagable with the braking linkage when the braking linkage is in a position corresponding to the brake engaged position to lock the linkage in the brake engaged position to engage the parking brake feature.

In another aspect, the invention is directed to a drive assembly for a working vehicle. The working vehicle has an engine that powers at least one drive wheel through a transmission drive unit, the transmission drive unit being controlled with a speed input mechanism. The drive assembly has a cruise control feature used to maintain a specified vehicle speed thereby eliminating the need for constant application of pressure to the speed input mechanism in order to keep the vehicle moving at the desired rate of speed. The drive assembly also has a parking brake feature that locks a brake input mechanism in its brake engaged position. The drive assembly has a speed and direction control linkage operatively connecting the speed input mechanism with the transmission drive unit. The speed and direction control linkage includes an accelerator shaft connected to the speed input mechanism, a speed control plate connected to the accelerator shaft, and a forward/reverse control rod connected at one end to the speed control plate and operatively connected at its opposite end to the transmission drive unit, Movement of the speed input mechanism causes the speed control plate to move the forward/reverse control rod in either a forward or rearward direction to control the direction and magnitude of speed of the transmission drive unit. The drive assembly also includes a braking linkage operatively connected to the brake pedal for selectively slowing or stopping the movement of the drive wheel. The brake linkage includes a brake shaft connected to the brake pedal, a brake cam on the brake shaft, and a brake rod connected to the brake cam such that pressing the brake pedal forwardly axially rotates the brake shaft causing the brake cam to rotate, which in turn causes a linear movement of the brake rod which actuates a vehicle brake. The drive assembly also includes cruise control/parking brake engagement means interfacing with the speed and direction control linkage and the braking linkage for actuating the cruise control and parking brake features using only a single cruise control/parking brake operating lever.

In another aspect, the invention is directed to a lawn or garden traction incorporating a drive assembly having a cruise control/parking brake engagement means interfacing with a speed and direction control linkage and a braking linkage for actuating cruise control and parking brake features using only a single cruise control/parking brake operating lever.

These and other objects, features, and advantages of the present invention will become apparent to one skilled in the art upon examination and analysis of the following description in view of the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
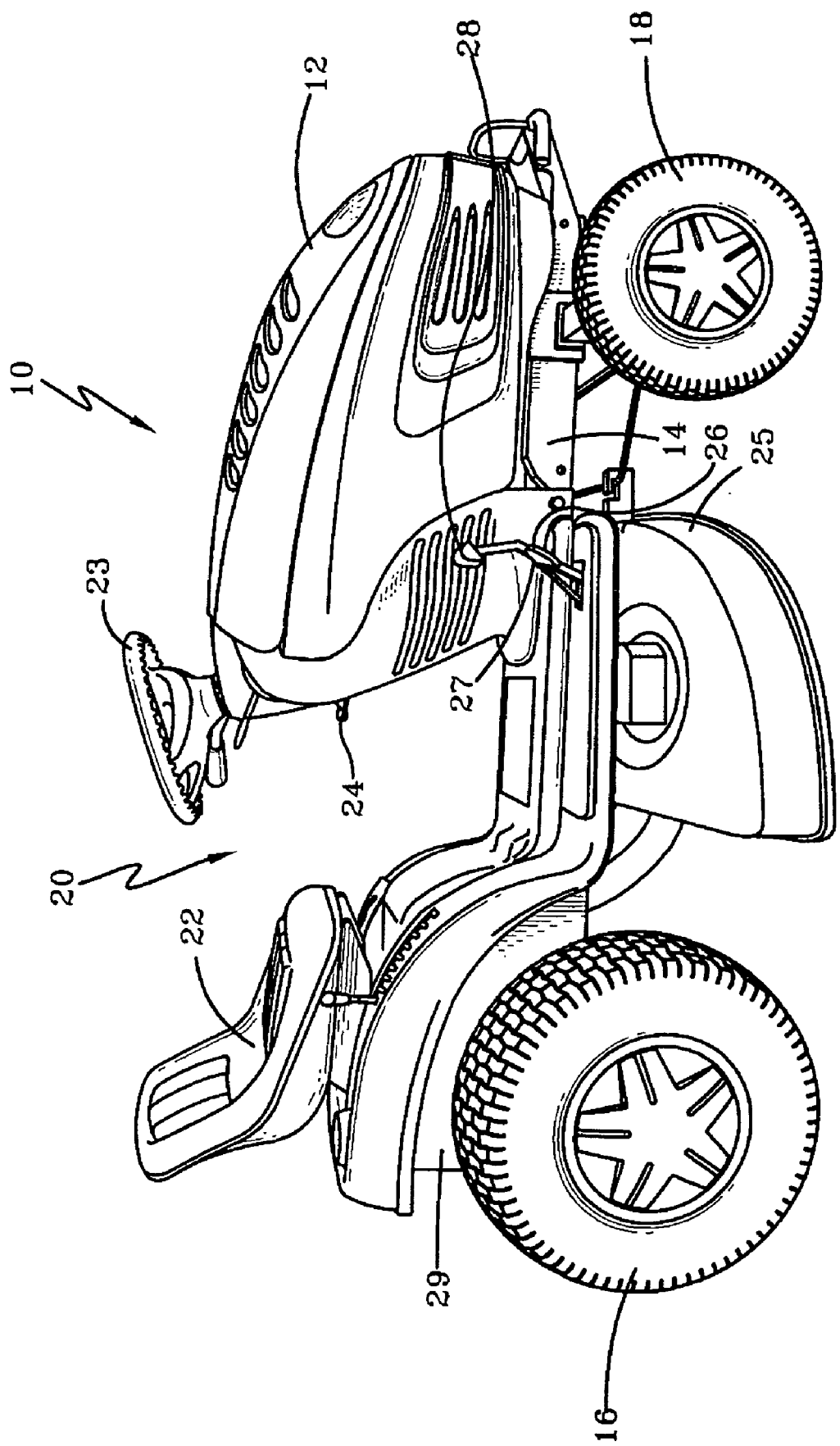
FIG. 1 is a perspective view of a lawn and garden type vehicle incorporating the invention.

Referring now to the Figures, a working vehicle 10, such as a lawn or garden tractor, is illustrated in FIG. 1. The vehicle 10 includes a prime mover such as an engine 12 mounted to a structural frame or chassis 14. The vehicle 10 includes drive wheels 16 such as left and right rear wheels located toward the rear of the vehicle 10. The drive wheels 16 are operatively connected to the engine 12 to provide locomotion to the vehicle 10. The vehicle 10 also has steerable ground-engaging wheels 18 such as right and left front wheels. An operator's station 20, which includes a seat 22 and a steering wheel 23, is supported on the chassis 14. A cruise control/parking brake control knob or lever 24 is also accessible from the operator's station 20. According to the invention, the cruise control/parking brake control knob or lever 24 is the only operator or input mechanism required to engage both the parking brake feature and the cruise control feature of the vehicle 10 as will be explained below. In that the vehicle 10 may be a lawn or garden tractor, a mower deck 25 is illustrated in FIG. 1. The mower deck 25 may be mounted to the vehicle 10 in any manner chosen with sound engineering judgment. Even though the illustrated vehicle 10 is a lawn or garden tractor, the invention is equally applicable to other types of working vehicles, including but not limited to utility vehicles, off road vehicles, golf carts, etc.

A forward portion of the operator station 20 includes foot controls 26 which accommodate a speed input mechanism 27 and brake input mechanism such as a foot brake pedal 28. The speed input mechanism 27 provides speed inputs to the vehicle 10 to suitably regulate the forward and reverse speed of the vehicle 10 and may take the form of one or more foot pedals. The speed input mechanism 27 can have separate forward and reverse pedals or have a single pedal such as a treadle pedal arrangement mounted on a single shaft as is known in the art. In such an embodiment, the pedal is rocked forward using the front of the foot to select forward drive, or rocked backward, using the heel of the foot to select reverse drive. Desirably, the speed input pedal 27 is biased toward a central position, corresponding to a neutral or stationary condition.

The left and right drive wheels 16 are driven through respective left and right transmission means or locomotive drive units 29. Preferably, the drive units 29 are transmissions of the continuously variable type, capable of providing a continuous range of ratios from forward to reverse. Examples of a suitable transmission utilizing a ratio varying-device, or variator, in conjunction with an epicyclic shunt gear to provide a geared neutral facility is described in International Application PCT/GB03/00332, published under WO 03/064892, and International Application PCT/GB03/02332, published under WO 03/100295. Alternately, the drive units 29 may be hydrostatic transmissions (HST) or electric motors, both of which are well known in the art.

Figure 2:
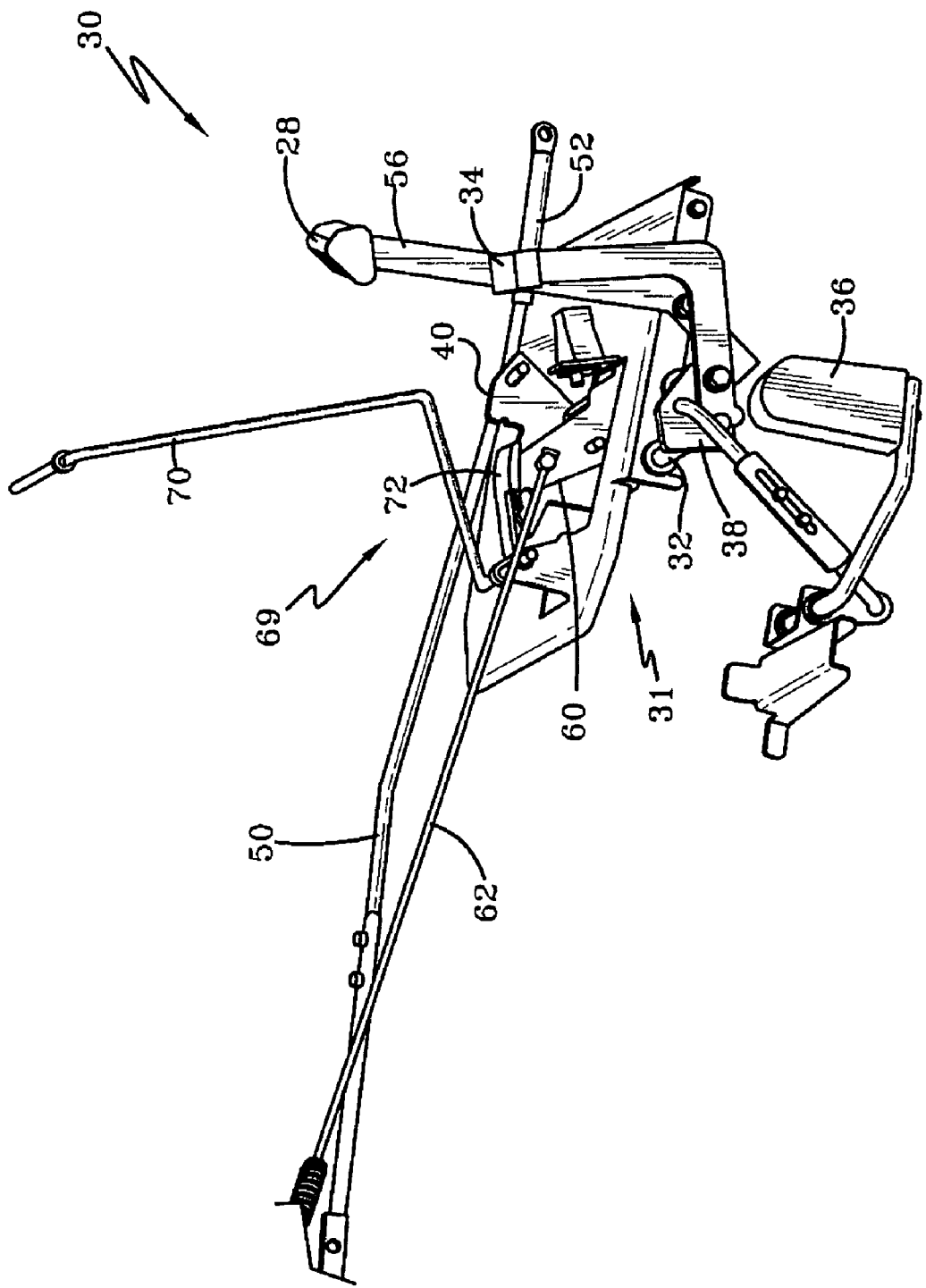
FIG. 2 is a view of the drive system of the vehicle of FIG. 1 having a parking brake and cruise control assembly according to the invention.
Figure 3:
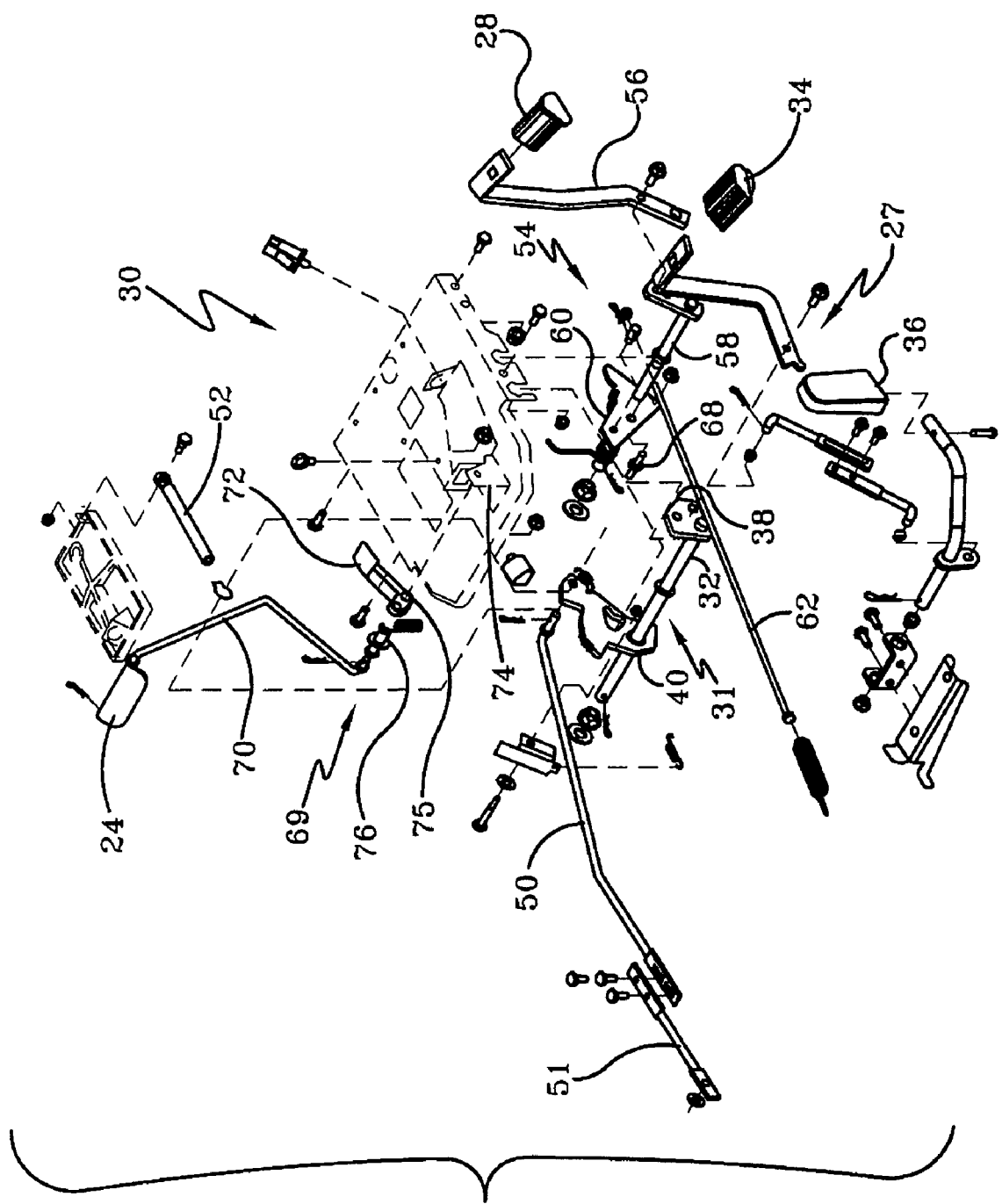
FIG. 3 is an exploded a view of the drive system with the parking brake and cruise control assembly of FIG. 2.

Turning now to FIGS. 2 and 3, a vehicle drive assembly having a parking brake and cruise control features is illustrated generally at reference numeral 30. The assembly 30 includes a speed and direction control linkage 31 operatively connecting the speed input mechanism 27 with the transmission drive units. As best seen in the exploded view of FIG. 3, the illustrated embodiment of the speed and direction control linkage 31 comprises an accelerator shaft 32 connected to the speed input mechanism 27. In the illustrated embodiment, the speed input mechanism 27 comprises forward and reverse speed pedals 34, 36 connected to the accelerator shaft 32 at lobe 38. As will be well understood, pressing the forward pedal 34 causes the accelerator shaft 32 to rotate in a first direction and pressing the reverse pedal 36 causes the accelerator shaft 32 to rotate in a second, opposite direction.

Figure 4:
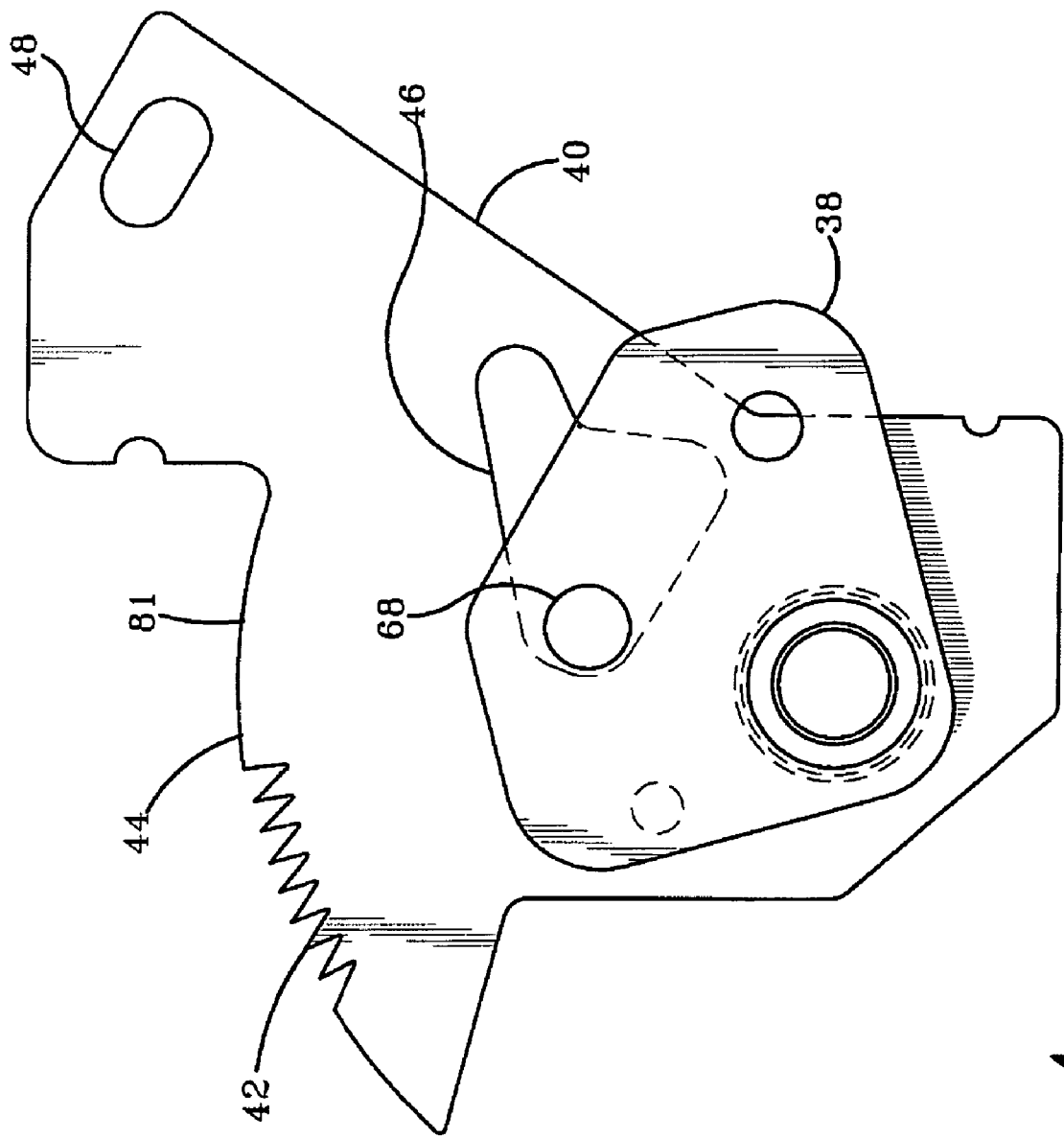
FIG. 4 is an enlarged view of a speed control plate of the drive system with the parking brake and cruise control assembly of FIG. 2.

A speed control plate 40 is connected, such as by welding, to the accelerator shaft 32. As best seen in the enlarged view of FIG. 4, the speed control plate 40 is shaped to have a series of teeth 42 on an upper surface 44 thereof, a lockout opening 46 generally in the middle thereof, and a second opening or slot 48 at outer portion thereof. However, the illustrated shape, and thus the specific relative positions of the teeth 42, lockout opening 46 and slot 48, is only one embodiment of the speed control plate 40 and one skilled in the art may design the cruise control/parking brake assembly 30 such that the speed control plate 40 could be made having other shapes using sound engineering principles without departing from the scope of the invention.

Figure 5:
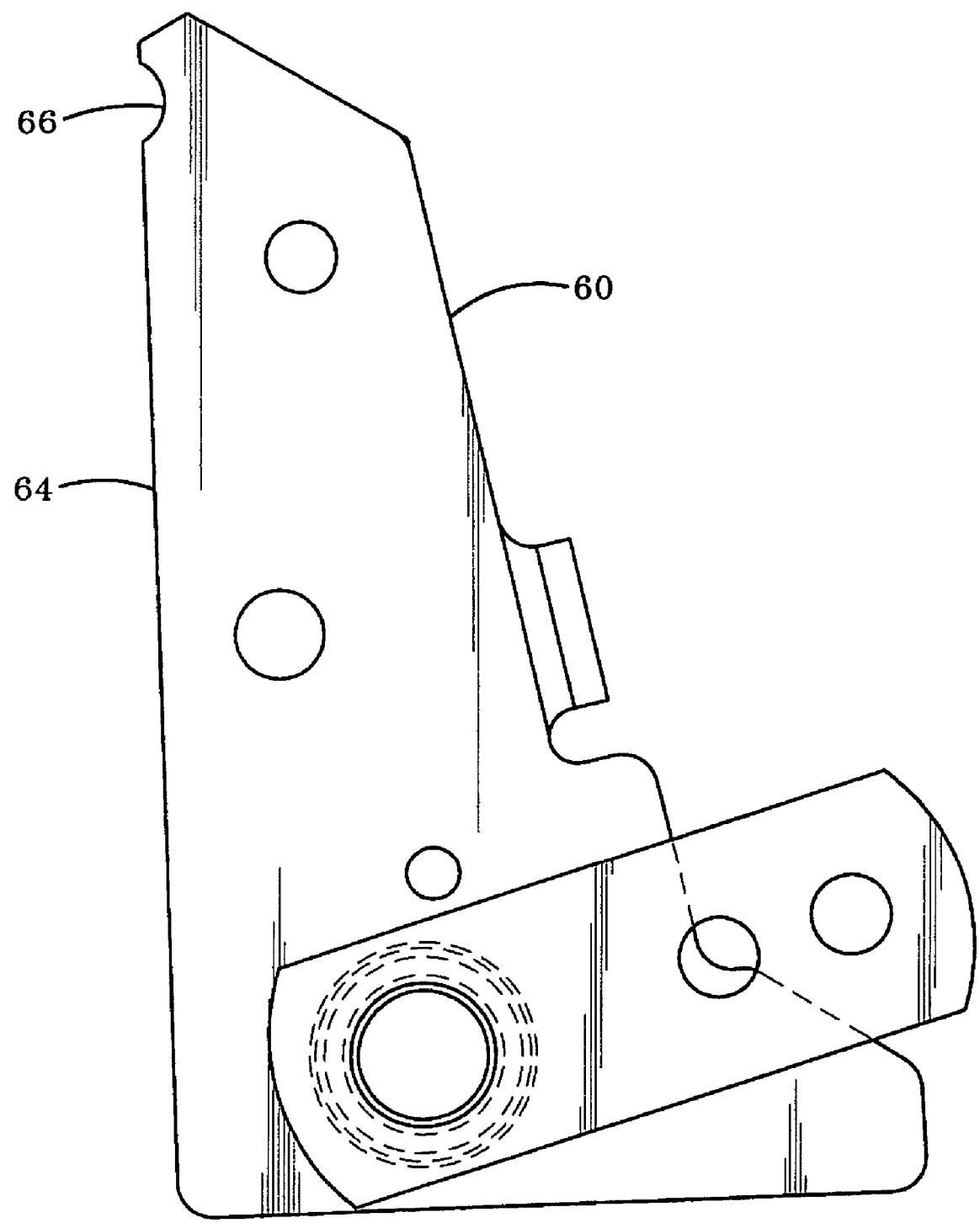
FIG. 5 is an enlarged view of a brake cam of the drive system with the parking brake and cruise control assembly of FIG. 2.

Returning to FIG. 3, a forward/reverse control rod 50 is attached to the speed control plate 40 in the slot 48 such that the speed control plate 40 moves the forward/reverse control rod 50 in either a forward or rearward direction to control the direction and magnitude of speed of the vehicle 10. The speed control plate 40 pulls the control rod 50 forward when the forward pedal 34 is actuated and pushes the control rod 50 rearward when the reverse pedal 36 is actuated. The forward/reverse control rod 50 is operatively connected at its rearward end 51 to the transmission drive units 29 (FIG. 1) such as with a ball joint (not shown) so that the position of the speed control plate 40 controls the direction and magnitude of speed of the transmission drive units 29 through movement of the forward/reverse control rod 50. Control of the transmission drive units 29 with the forward/reverse control rod 50 can be though any means known in the art and need not be discussed herein. Desirably, a damper 52 attaches to the speed control plate 40 and together with the shape of the slot 48 provides a dwell in the speed control plate 40 that allows for a delay in drive engagement of the transmission drive units 29 to allow a back over protection system (not shown) to be engaged before the transmission drive units are activated, thereby allowing for safe operation The vehicle drive assembly 30 also includes a braking linkage 54 operatively connected to the brake pedal 28 for selectively slowing or stopping the movement of the vehicle 10. In the illustrated embodiment, the brake linkage 54 includes a brake arm 56 connected to the brake pedal 28 that is fixed to a brake shaft 58. Pressing the brake pedal 28 forwardly pivots the brake arm 56 and axially rotates the brake shaft 58. A brake cam 60 is fixed to the brake shaft 58 such that rotation of the brake shaft 58 swings the brake cam 60, which in turn pulls a brake rod 62. The brake rod 62 is connected to the brake cam 60 so that rotation of the brake shaft 58 causes a linear movement of the brake rod 62. The opposite end of the brake rod 62 is operatively connected to a transmission brake arrangement (not shown) within the transmission drive units 29 to actuate a vehicle brake, such as a transmission brake (not shown). Suitable transmission brakes are well known in the art and need not be discussed herein. As best seen in the enlarged view of FIG. 5, the brake cam 60 has a rear surface 64 with a notch 66 formed therein.

Desirably, a lockout function is performed by a pin 68 between the brake cam 60 and the speed control plate 40 that prevents the forward and reverse pedals 34, 36 from being engaged to rotate the speed control plate 40 if the brake cam 60 is set in the brake position. The shape of the lockout opening 46 in the speed control plate 40 cooperates with the pin 68 to provide the lockout function.

Figure 6:
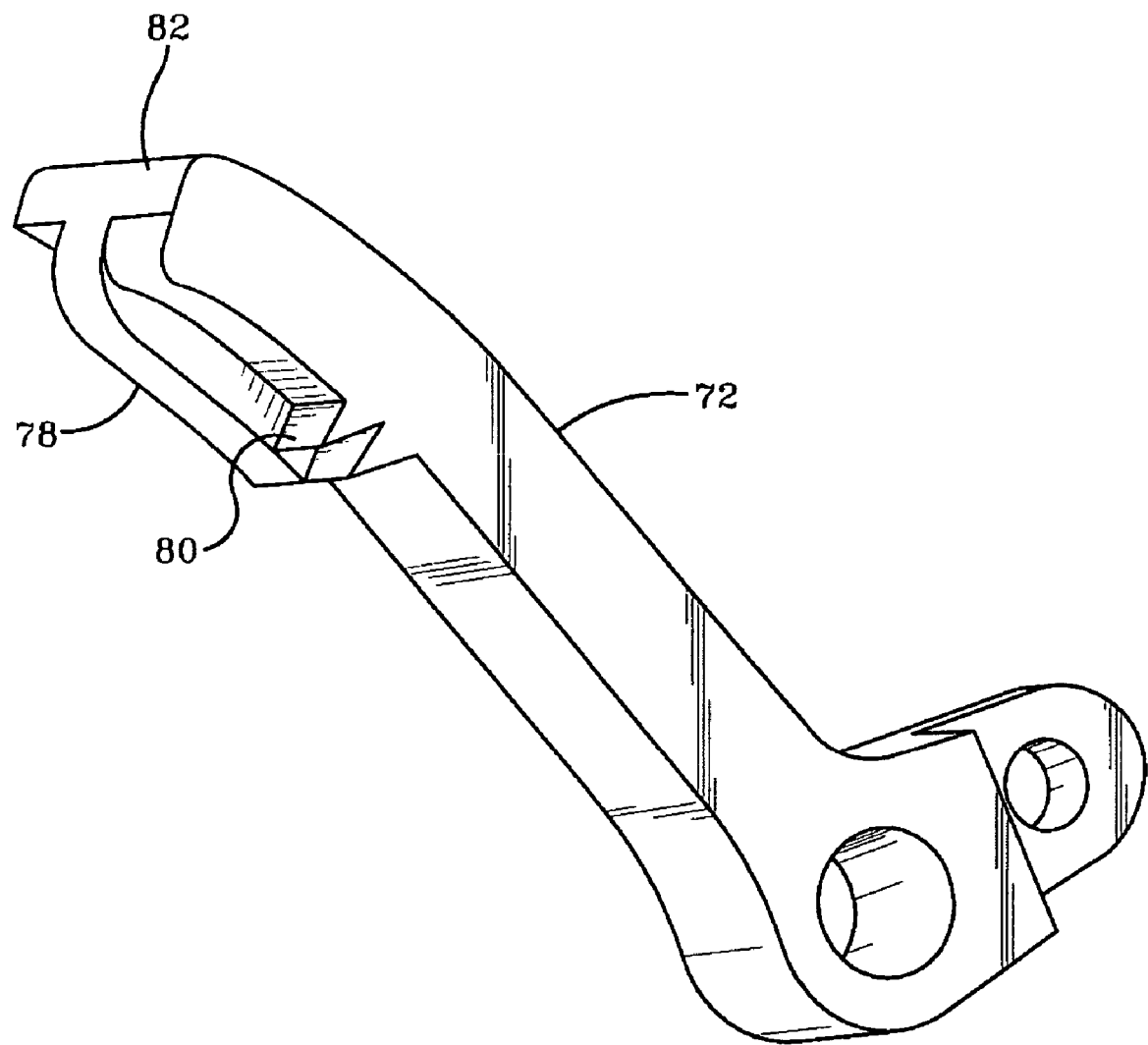
FIG. 6 is an enlarged view of a cruise control/parking brake pawl of the drive system with the parking brake and cruise control assembly of FIG. 2.

The cruise control/parking brake lever 24 is connected to a cruise control/parking brake engagement linkage 69. In the illustrated embodiment, the cruise control/parking brake engagement linkage 69 comprises a linkage rod 70 connected at its proximal end to the cruise control/parking brake lever 24. The distal end of the linkage rod 70 is connected to a cruise control/parking brake pawl 72 pivotally mounted on a bracket 74 at a pivot joint 75. In one embodiment, movement of the linkage rod 70 causes the pawl 72 to pivot about the axis of a shoulder bolt 76 attaching the pawl 72 to the bracket 74. In operation, the pawl 72 selectively engages both the braking cam 60 and the speed control plate 40 to enable parking brake and cruise control engagement. As best seen in the enlarged view of FIG. 6, the pawl 72 includes a first engagement end 78 having a tooth 80. The tooth 80 is configured to engage the toothed surface 42 in the top edge 44 of the speed control plate 40 to lock the speed control plate 40 in place.

Operation of the cruse control feature of the park brake and cruise control assembly 30 will now be discussed. The operator depresses the forward pedal 34 to set the desired speed of the vehicle 10. When the desired speed is reached, cruise control is engaged by actuation of the cruise control/parking brake lever 24. Actuation of the lever 24 causes linkage rod 70 to pivot the pawl 72 such its tooth 80 engages the toothed surface 42 of the speed control plate 40 at a position corresponding to the desired speed. The position of the speed control plate 40 will be held or locked by the tooth 80 of the pawl 72 until the cruise control is later disengaged. The top surface 44 of the speed control plate 40 may also have a relatively smooth non-engageable region 81 corresponding to the positions of the speed control plate 40 when in the reverse speeds such that the pawl 72 of the cruise control/parking brake assembly 30 cannot be engaged to the speed control plate 40 when operating in the reverse direction.

To engage the parking brake feature of the cruise control/parking brake assembly 30, the brake pedal 28 is actuated to rotate the brake shaft 58. Rotation of the brake shaft 58 causes the brake cam 60 to rotate forward and move the brake rod 62. With the brake cam 60 in the forward position, the operator can actuate the cruise control/park brake control lever 24 to pivot the pawl 72 so that a front edge 82 of the pawl 72 engages the notch 66 on the back surface 64 of the brake cam 60. The pawl 72 locks the brake cam 60 in the brake engaged position even after the operator releases the brake pedal 52 such that the brake rod 62 continues to engage the transmission brake. To release the parking brake, the operator depresses the brake pedal 28, causing the brake cam 60 to rotate an additional amount, thereby releasing the pawl 72 from the notch 66.

To disengage the cruise control, the operator can either depress the forward pedal 34 an additional amount to rotate the speed control plate 40 and release the engagement of the tooth 80 from the tooth surface 42, or actuate the brake pedal 28. Actuating the brake pedal 28 causes the brake cam 60 to knock the pawl 72 out of engagement with the speed control plate 40. Thus, the brake cam 60 on the brake shaft 58 disengages the cruise control if the brake is required.

Figure 7:
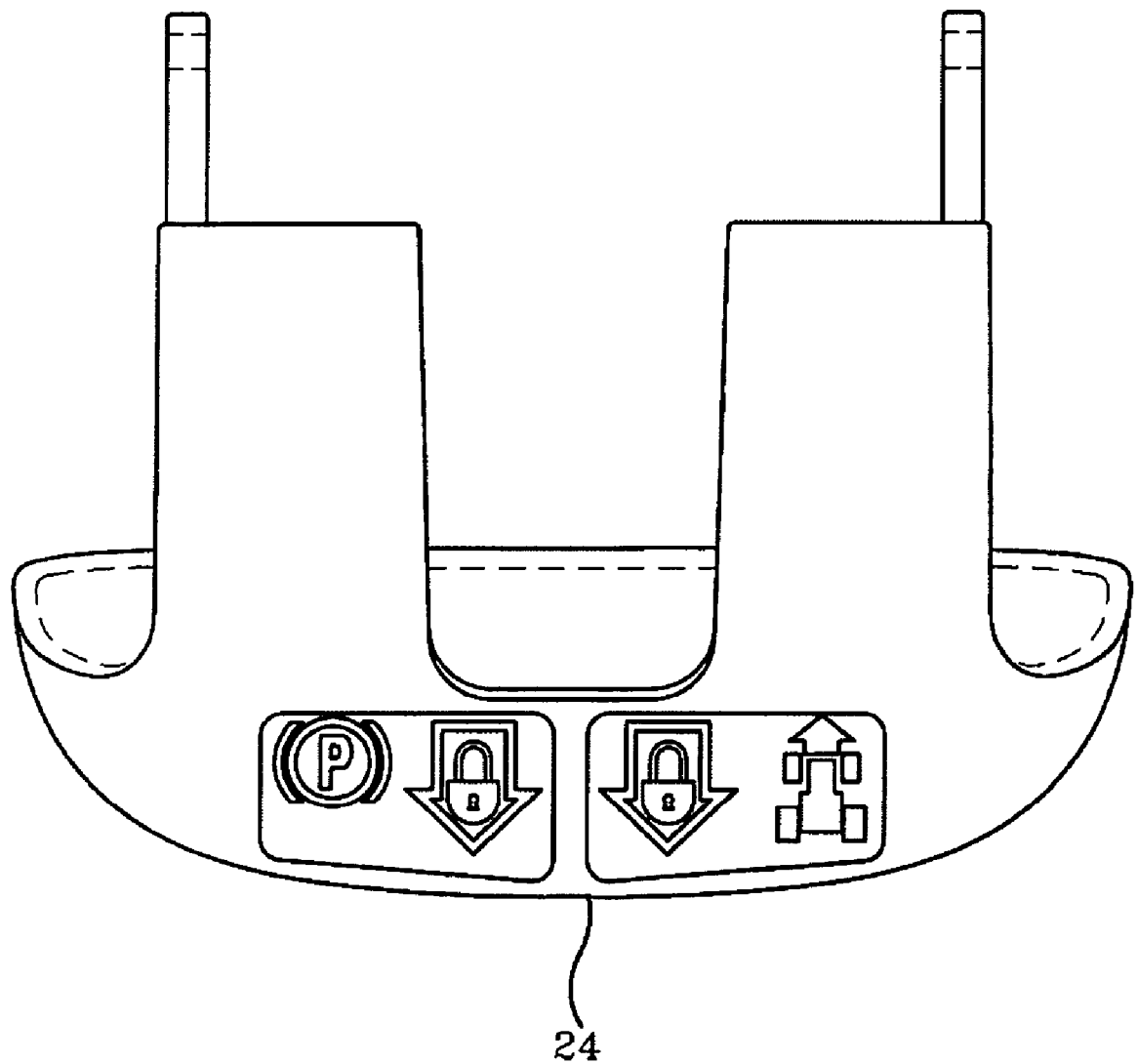
FIG. 7 is an enlarged view of a single cruise control/parking brake control lever of the drive system with the parking brake and cruise control assembly of FIG. 2.

As best seen in FIG. 7, the operator controlled cruise control/parking brake knob or lever 24 is accessible from the operator control station 20. The cruise control/parking brake lever 24 is connected to the pawl 72 via the linkage 70 so that the lever 24 is used to set both the cruise control and the parking brake. Therefore, according to the invention, only a single control knob or lever 24 is required to engage the parting brake and/or cruise control. This design offers cost and complexity advantages over current models in the market.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A drive assembly for a working vehicle having an engine that powers at least one drive wheel through a transmission drive unit, the transmission drive unit being controlled with a speed input mechanism, wherein the drive assembly has a cruise control feature used to maintain a specified vehicle speed thereby eliminating the need for constant application of pressure to the speed input mechanism in order to keep the vehicle moving at the desired rate of speed, and the drive assembly also has a parking brake feature that locks a brake input mechanism in its brake engaged position, the drive assembly comprising:

a speed and direction control linkage operatively connecting the speed input mechanism with the transmission drive unit;

a braking linkage operatively connected to the brake input mechanism for selectively slowing or stopping the movement of the drive wheel; and a cruise control/parking brake engagement linkage interacting with said speed and direction control linkage and said braking linkage when the speed and direction control linkage and the braking linkage are in select conditions, wherein the cruise control/parking brake engagement linkage has a single cruise control/parking brake operating lever that, upon actuation, locks the braking linkage in the brake engaged position to engage the parking brake feature when said braking linkage is in the brake engaged position and locks the speed and direction control linkage in a position corresponding to a desired speed to engage the cruise control feature when said speed and direction control linkage is in said position for the desired speed such that the cruise control/parking brake lever is the only input mechanism required to engage the parking brake and cruise control features.

2. The drive assembly of claim 1 wherein the cruise control/parking brake engagement linkage comprises a pawl having a first engagement portion with a tooth formed thereon and a second engagement portion, wherein the pawl is pivotally mounted such that the first engagement portion with the tooth is engagable with the speed and direction control linkage when the speed and direction control linkage is in a position corresponding to a desired speed to lock said linkage in position, and wherein the second engagement portion is engagable with the braking linkage when the braking linkage is in a position corresponding to the brake engaged position.

3. The drive assembly of claim 2 wherein the cruise control/parking brake engagement linkage comprises a linkage rod connecting the cruise control/parking brake lever to the pawl.

4. The drive assembly of claim 3 wherein the vehicle has an operator's station and the cruise control/parking brake lever is accessible from the operators station to engage the cruise control and parking brake features.

5. The drive assembly of claim 4 wherein the speed and direction control linkage comprises an accelerator shaft connected to the speed input mechanism, a speed control plate connected to the accelerator shaft, and a forward/reverse control rod connected at one end to the speed control plate and operatively connected at its opposite end to the transmission drive unit such that movement of the speed input mechanism causes the speed control plate to move the forward/reverse control rod in either a forward or rearward direction to control the direction and magnitude of speed of the transmission drive unit.

6. The drive assembly of claim 5 wherein the speed control plate has a series of teeth on a surface thereof and the tooth on the first engagement portion of the pawl engages one of the teeth in the series of teeth to lock the position of the speed control plate and engage the cruise control feature.

7. The drive assembly of claim 6 wherein the speed input mechanism comprises a forward foot pedal and a reverse foot pedal.

8. The drive assembly of claim 3 wherein the brake linkage comprises a brake shaft connected to the brake input mechanism, a brake cam on said brake shaft, and a brake rod connected to said brake cam such that pressing the brake input mechanism forwardly axially rotates the brake shaft causing the brake cam to rotate, which in turn causes a linear movement of the brake rod to actuate a vehicle brake.

9. The drive assembly of claim 8 wherein the brake cam has a rear surface with a notch formed therein and the second engagement portion of the pawl engages the notch to lock the position of the brake cam and engage the parking brake feature.

10. The drive assembly of claim 9 wherein rotation of the brake shaft causes the brake cam to rotate forward and move the brake rod, and with the brake cam in the forward position actuation of the cruise control/park brake operating lever causes the pawl to pivot so that the second engagement portion of the pawl engages the notch on the back surface of the brake cam such that the pawl locks the brake cam in the brake engaged position after the release of the brake input mechanism such that the brake rod continues to engage the vehicle brake.

11. The drive assembly of claim 10 wherein the brake input mechanism comprises a foot brake pedal.

12. The drive assembly of claim 3 wherein the pawl selectively engages both a braking cam in the braking linkage to enable the parking brake feature and a speed control plate in the speed and direction control linkage to enable the cruise control feature.

13. A lawn tractor comprising the drive assembly of claim 1.

14. A drive assembly for a working vehicle having an engine that powers at least one drive wheel through a transmission drive unit, the transmission drive unit being controlled with a speed input mechanism, wherein the drive assembly has a cruise control feature used to maintain a specified vehicle speed thereby eliminating the need for constant application of pressure to the speed input mechanism in order to keep the vehicle moving at the desired rate of speed, and the drive assembly also has a parking brake feature that locks a brake input mechanism in its brake engaged position, the drive assembly comprising:

a speed and direction control linkage operatively connecting the speed input mechanism with the transmission drive unit;

a braking linkage operatively connected to the brake input mechanism for selectively slowing or stopping the movement of the drive wheel; and a cruise control/parking brake engagement linkage comprising a pawl having a first engagement portion with a tooth formed thereon and a second engagement portion, wherein the cruise control/parking brake engagement linkage further consist of a single cruise control/parking brake operating lever that, upon actuation, causes said pawl to pivot such that the first engagement portion with the tooth is engagable with the speed and direction control linkage when the speed and direction control linkage is in a position corresponding to a desired speed to lock said speed and direction control linkage in said position to engage the cruise control feature, and wherein the second engagement portion is engagable with the braking linkage when the braking linkage is in a position corresponding to the brake engaged position to lock said braking linkage in said brake engaged position to engage the parking brake feature such that the cruise control/parking brake lever is the only input mechanism required to engage the parking brake and cruise control features.

15. The drive assembly of claim 14 wherein the vehicle has an operator's station and the cruise control/parking brake lever is accessible from the operators station to engage the cruise control and parking brake features.

16. The drive assembly of claim 15 wherein the speed and direction control linkage comprises an accelerator shaft connected to the speed input mechanism, a speed control plate connected to the accelerator shaft, and a forward/reverse control rod connected at one end to the speed control plate and operatively connected at its opposite end to the transmission drive unit such that movement of the speed input mechanism causes the speed control plate to move the forward/reverse control rod in either a forward or rearward direction to control the direction and magnitude of speed of the transmission drive unit, and wherein the speed control plate has a series of teeth on a surface thereof and the tooth on the first engagement portion of the pawl engages one of the teeth in the series of teeth to lock the position of the speed control plate and engage the cruise control feature.

17. The drive assembly of claim 15 wherein the brake linkage comprises a brake shaft connected to the brake input mechanism, a brake cam on said brake shaft, and a brake rod connected to said brake cam such that pressing the brake input mechanism forwardly axially rotates the brake shaft causing the brake cam to rotate, which in turn causes a linear movement of the brake rod which actuates a vehicle brake, and wherein the brake cam has a rear surface with a notch formed therein and the second engagement portion of the pawl engages the notch to lock the position of the brake cam and engage the parking brake feature.

18. The drive assembly of claim 17 wherein rotation of the brake shaft causes the brake cam to rotate forward and move the brake rod, and with the brake cam in the forward position, actuation of the cruise control/park brake operating lever causes the pawl to pivot so that the second engagement portion of the pawl engages the notch on the back surface of the brake cam such that the pawl locks the brake cam in the brake engaged position after the release of the brake input mechanism such that the brake rod continues to engage the vehicle brake.

19. A drive assembly for a working vehicle having an engine that powers at least one drive wheel through a transmission drive unit, the transmission drive unit being controlled with a speed input mechanism, wherein the drive assembly has a cruise control feature used to maintain a specified vehicle speed thereby eliminating the need for constant application of pressure to the speed input mechanism in order to keep the vehicle moving at the desired rate of speed, and the drive assembly also has a parking brake feature that locks a brake pedal in its brake engaged position, the drive assembly comprising:

a speed and direction control linkage operatively connecting the speed input mechanism with the transmission drive unit, wherein the speed and direction control linkage comprises an accelerator shaft connected to the speed input mechanism, a speed control plate connected to the accelerator shaft, and a forward/reverse control rod connected at one end to the speed control plate and operatively connected at its opposite end to the transmission drive unit such that movement of the speed input mechanism causes the speed control plate to move the forward/reverse control rod in either a forward or rearward direction to control the direction and magnitude of speed of the transmission drive unit;

a braking linkage operatively connected to the brake pedal for selectively slowing or stopping the movement of the drive wheel, wherein the brake linkage comprises a brake shaft connected to the brake pedal, a brake cam on said brake shaft, and a brake rod connected to said brake cam such that pressing the brake pedal forwardly axially rotates the brake shaft causing the brake cam to rotate, which in turn causes a linear movement of the brake rod which actuates a vehicle brake; and cruise control/parking brake engagement means interfacing with the speed and direction control linkage and the braking linkage for actuating the cruise control and parking brake features using only a single cruise control/parking brake operating lever.

20. The drive assembly of claim 19 wherein the cruise control/parking brake engagement means comprises comprising a pawl having a first engagement portion with a tooth formed thereon and a second engagement portion, wherein the cruise control/parking brake engagement means further consist of a single cruise control/parking brake operating lever that, upon actuation, causes said pawl to pivot such that the first engagement portion with the tooth is engagable with the speed and direction control linkage when the speed and direction control linkage is in a position corresponding to a desired speed to lock said linkage in said position to engage the cruise control feature, and wherein the second engagement portion is engagable with the braking linkage when the braking linkage is in a position corresponding to the brake engaged position to lock said linkage in said brake engaged position to engage the parking brake feature such that the cruise control/parking brake lever is the only input mechanism required to engage the parking brake and cruise control features.

* * * * *